A. BIRCHMAN, G. O. MATTER, AND J. H. McCOY.
NUT LOCK.
APPLICATION FILED MAR. 17, 1920. RENEWED JAN. 10, 1922.
1,424,978.
Patented Aug. 8, 1922.
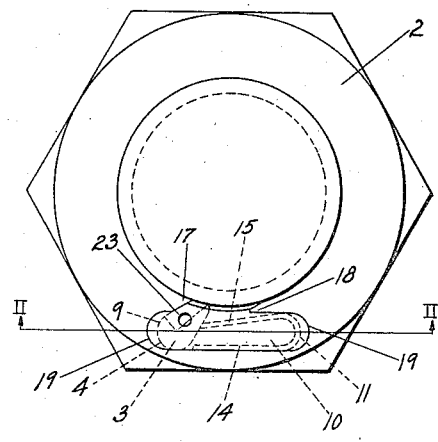
Fig.I
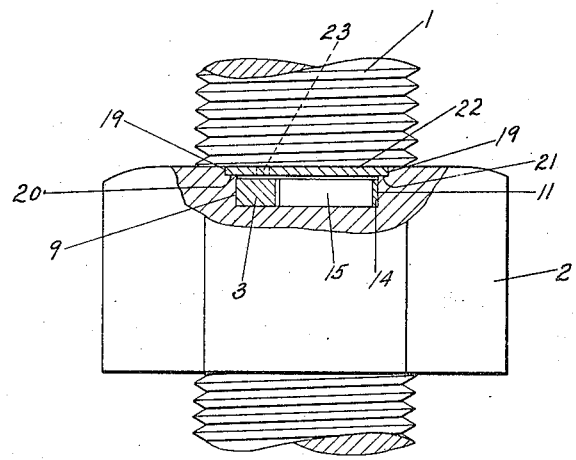
Fig.II
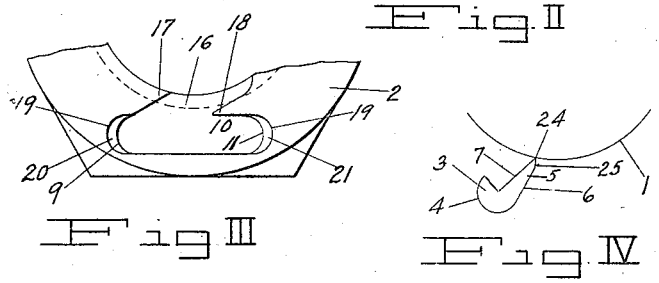
Fig.III
Fig.IV
INVENTORS:
Andrew Birchman
Gustavus O. Matter
Joseph H. McCoy
By Atkins & Atkins
ATTORNEYS.

UNITED STATES PATENT OFFICE.

ANDREW BIRCHMAN, GUSTAVE O. MATTER, AND JOSEPH H. McCOY, OF PORTLAND, OREGON, ASSIGNORS TO UNIVERSAL NUT LOCK COMPANY, OF PORTLAND, OREGON, A CORPORATION OF OREGON.

NUT LOCK.

1,424,978.    Specification of Letters Patent.    Patented Aug. 8, 1922.

Application filed March 17, 1920, Serial No. 366,583. Renewed January 10, 1922. Serial No. 528,138.

*To all whom it may concern:*

Be it known that we, ANDREW BIRCHMAN, GUSTAVE O. MATTER, and JOSEPH H. McCOY citizens of the United States of America (except the said ANDREW BIRCHMAN, who, being a subject of Sweden, is a declarent) and all residents of the city of Portland in the county of Multnomah, in the State of Oregon, have invented certain new and useful Improvements in Nut Locks, of which the following is a specification, reference being had to the accompanying drawing.

Our invention relates to nut locks, and has for its object the production of a nut adapted to be employed upon any bolt of suitable dimensions and thread, and economically provided with a permanent, self-contained, and efficient locking member for securing it against backward rotation at any point of adjustment upon its bolt.

The means by which the aforesaid object of our invention is attained, are found in the form of the locking member and its relationship to the nut and bolt, in the means provided for its accommodation and actuation within the nut, and in the shape of the chamber provided in the nut for its reception.

What constitutes our invention will be hereinafter specified in detail and succinctly set forth in the appended claims.

In the accompanying drawing,

Figure I is an end view of a bolt and, applied thereto, a nut equipped with our invention in present preferred form of embodiment.

Figure II is a side elevation of the subject matter of Figure I, with a portion of the nut broken away to exhibit the locking member thereof and its actuating spring.

Figure III is a detached view showing enough of the nut to exhibit in plan an empty chamber ready for accommodation of a locking member.

Figure IV is a diagrammatic plan view illustrative of the shape of our locking member and its operative relationship to the periphery of a bolt.

Referring to the numerals on the drawing, 1 indicates a threaded bolt which may be of any suitable and preferred size and cut of thread. It is illustrated only as a complementary member to a nut 2, within which are shown in present preferred form of embodiment all the details of our invention. In respect to the same, we employ a locking-member 3, which has a rounded, preferably, semi-cylindrical body 4, and projecting therefrom a finger 5 whose contour is preferably defined by one side 6 that is substantially tangential to the semi-circle defining the curvature of the body 4, and by a second side 7 that is substantially diametrical thereto.

The body 4 is fitted to a socket 9 provided for it in the body of the nut, the socket 9 being constructed on a radius correspondent to that of the curvature of the body 4.

Considerable difficulty of manufacture was experienced in shaping within the body of an ordinary nut a chamber for the operative accommodation of any locking-member and particularly of our locking-member 3 as above shown and described; but the form of the lock-chamber shown removes the difficulty. Said lock-chamber consists of two branches of substantially equal width which are disposed at an angle to each other that is located at the center of the semi-cylindrical socket 9 where the axes of the two branches of the chamber meet. The axis of one branch is indicated by the section line II—II and is parallel to a tangent to the circle that measures the periphery of the bolt 1. The axis of the other branch extends into the interior of the bore of the nut at a determinate angle.

The main branch 10 of the lock-chamber is not only oblong and terminating at one end in the socket 9 as described, but preferably terminates at the other end in a curved wall 11, corresponding in shape to the wall of it which defines the socket 9.

The advantage of a chamber constructed as specified is at least twofold, in that it admits of the use of a single cutting tool in shaping it, which is essential to its economical manufacture, and also affords a snug seat ready of access for a flat spring 14 for actuating the locking-member 3 by vibration produced by the resiliency of the spring 14 upon its movable arm 15. The spring 14 is bent to conform to the curvature of the wall 11 which insures a firm, unyielding support for the spring that holds it to its office, and at the same time facilitates its emplacement and displacement as occasion may require.

The angular relationship of the axis of the branch 10 to that of the branch 16, the sides of which, respectively, are parallel, defines two tongues 17 and 18, the former constituting a stop-piece against the vibratory movement of the finger 5 of the locking-member, and the latter a confining member to the arm 15 of the spring 14 and limiting its movement in one direction. By provision of the tongues 17 and 18, the combination of the nut and its locking-member is made self-containing, so that the same is ready at all times for service irrespective of the presence of the bolt 1. In other words, the lock nut is complete in itself and ready for application to a bolt whenever required without any attention to or manipulation of its working parts.

The lock-chamber is enlarged on its outwardly opening side by an external cavity 19, differentiated from the chamber preferably by terminal extensions that define benches 20 and 21 disposed, respectively, in operative propinquity to opposite sides of the chamber, preferably the ends of the branch 10 thereof. A cap 22 is fitted to cover said chamber and to fill the cavity 19 flush with its side walls. When driven against the benches 19 and 20, the cap 22 is held in place by a jamb fit, thereby contributing a smooth finish to the nut and serving to hold the working parts of its locking-mechanism securely in place.

The cap 22 is transversely penetrated by an aperture 23 that affords, to a prick awl or other suitable instrument of that sort, operative communication with the side 7 of the finger 5, whereby the finger may be actuated against the force of the spring 14 to release engagement between the finger and the bolt 1, whenever desired.

The length of the side 7 determines the angle at which it meets the periphery of the bolt 1, and is, therefore, an important factor in the construction of our nut. If it be too long, the edge 24 will slip upon the bolt, and if too short, the edge 24 may either fail of operative engagement with the bolt or bite too deeply into the metal of the bolt.

Its minimum of length may be determined by reference to a radius of the bolt 1, extended to cut the center of the semi-cylindrical portion of the body 4. Said radius also cuts the extreme point of the tongue 17 which, as already specified, limits the movement of the finger 5 in one direction.

The maximum limit to the possible length of the side 7 is imposed by the tongue 18, but in practice we prefer to employ for it a length more nearly approximating its potential minimum than its potential maximum, as is indicated in the drawing.

It is also important to define the edge 24 by a bevel face 25 that meets the side 7 at a slightly acute angle, substantially as shown in Figure IV.

The operation of our device will be understood, it is believed, from the foregoing specification without further description.

What we claim is:

1. The combination with a nut, provided with an oblong recess having its longitudinal axis substantially parallel to a tangent to the bore of the nut, and open means of operative communication with said bore, of a locking member pivotally mounted in one end of said recess and in operative communication, through said means, with said bore, and a locking-member-actuating spring operatively mounted in the other end of said recess.

2. The combination with a nut provided with an oblong recess having its longitudinal axis substantially parallel to a tangent to the bore of the nut and having semi-cylindrical ends, and open means of operative communication with the bore of said nut, of a locking member having a semi-cylindrical head pivotally fitting in one end of said recess and in operative communication through said means with said bore, and a leaf spring curved to fit the other end of said recess and extending within said recess into operative engagement with the locking member to actuate it towards the bore of the nut.

3. The combination with a nut provided with an oblong recess having its longitudinal axis substantially parallel to a tangent to the bore of the nut and having semi-cylindrical ends, and a spring-supporting tongue defining the side of the recess next to the body of the nut terminating short of the length of the recess to afford open means of communication between the recess and the bore of the nut, of a locking member having a semi-cylindrical head pivotally fitting in one end of said recess and in operative communication through said means with said bore, and a leaf spring curved to fit the other end of said recess and extending within said recess into operative engagement with the locking member to actuate it towards the bore of the nut.

4. The combination with a nut provided with an oblong recess having its longitudinal axis substantially parallel to a tangent to the bore of the nut and having semi-cylindrical ends, a spring-supporting tongue defining the side of the recess next to the body of the nut terminating short of the length of the recess to afford open means of communication between the recess and the bore of the nut, of a locking member having a semi-cylindrical head pivotally fitting in one end of said recess and in operative communication through said means with said bore, and a leaf spring curved to fit the other end of said recess and extending within said recess into operative engagement with the locking member to actuate it towards the bore of the nut, benches countersunk in the face of the nut adjacent to said recess, and a cap-plate making a jam retaining fit into the space provided by said benches over said recess and against said benches.

5. The combination of a nut provided with a recess adapted for the accommodation of a cooperative locking member and a spring, and open means of communication between said recess and the bore of the nut, for accommodation of the locking member, said recess and means of communication being of substantially equal width throughout their respective extents, whereby they may be both formed by the operation of a single tool.

In testimony whereof, we have hereunto set our hands in the presence of two subscribing witnesses.

ANDREW BIRCHMAN.
GUSTAVE O. MATTER.
JOSEPH H. McCOY.

Witnesses:
JOSEPH L. ATKINS,
LEICESTER B. ATKINS.